Patented June 26, 1951

2,558,286

UNITED STATES PATENT OFFICE 2,558,286

METHOD OF MAKING FRICTIONAL BEARING SURFACES

Carl W. Albertson, Fairfield, Ohio

No Drawing. Application August 27, 1945,
Serial No. 613,029

1 Claim. (Cl. 117—50)

This invention pertains to metallurgy, and more particularly to a method of lead treatment of bearing surfaces by impregnation of previously prepared bearing areas with finely subdivided metallic lead, and the surface finished bearing resulting therefrom.

For purpose of illustration, but with no intent to unduly limit the scope or application of the invention, it is herein described as applied to treatment and finishing of engine cylinders and cooperating piston rings, for which purpose it is well adapted, and especially efficacious in treatment of airplane engine cylinders. However, it is to be understood that it is not limited thereto, but may be utilized for improvement of cylindrical rotary or reciprocatory shaft bearings, and for slide bearings of both planar and contoured shapes.

There are many theories relative to cylinder wall and piston ring finish, and practices vary widely. The most common practice is to finish the cylinder wall with a somewhat rough grinding operation, a rough hone finish, or by lapping to rough the surface. The object of this rough finish is to hold lubricating oil and to also provide a lapping or abrasive action for seating the piston rings. The finish on the contact face of the piston rings is usually grooved perceptibly or rough turned to reduce the bearing area. By reducing the bearing area, the unit pressure is increased so that the oil film on the cylinder wall will be ruptured, permitting metal to metal contact between the bearing face of the piston ring and the cylinder wall. Such a procedure requires the greatest caution during the first few hours of run-in, while the cylinder walls and ring surfaces are smoothing each other by a wearing-in process. During this wearing-in process, metal to metal contact must be made between the ring face and the cylinder wall with a resulting abrasion of both parts. Otherwise the rings and cylinder walls would not come to a finish and seal against leakage. This process of abrasion releases many small metallic particles which tend to cause scoring and by circulation with the lubricant may cause bearing failure or damage to the other internal parts of the engines. While this method is in general practice, it is apparent that an engine whose cylinders and rings have been so processed will be critical during a large portion of the block test until the cylinder walls have been smoothed and any irregularity of the piston rings has been corrected, also until the bearing surface of the piston rings has increased sufficiently for the oil film to prevent metal to metal contact. It is fortunate that if during the run-in period the proper degree of finish can be arrived at on both the rings and cylinder wall simultaneously without destructive action taking place. It would be ideal if the cylinder walls and the piston rings could be prefinished before assembly, so that the wearing-in process could be eliminated during block test.

The critical period in internal combustion engine manufacture and repair occurs during the initial "run-in" period or block test, usually of about three hours' duration, when there is a tendency for destructive action to take place on the cylinder walls or piston rings, or both. In manufacture of airplane engines, it is common practice to run the engine during a preliminary period of approximately three hours at a reduced speed and load, known as the "green run," after which the engine is disassembled and examined for signs of scuffing or scoring on the cylinder walls and piston rings. If such destructive action occurs it necessitates replacement of the piston rings and reboring of the cylinder.

The object of this invention is to improve the surface finish, as well as the means and mode of production of bearing surfaces, particularly engine cylinders and piston rings and rapidly and economically induce formation thereon of highly polished, extremely smooth, glazed, wear resistant surfaces.

A further important object of the invention is to obviate the destructive action which is likely to occur during the initial "run-in" period and preliminary tests by minimizing the necessity for and duration of the "run-in" period, and materially increase the durability and extend the useful life of the cylinder walls and piston rings.

A further object of the invention is to minimize the time required for finishing and refinishing of engine cylinder walls and cooperating piston rings, and materially increase the efficiency thereof.

A further object of the invention is to provide an improved method of finishing bearing surfaces and increasing the wearing qualities thereof.

A further object of the invention is to provide bearing surfaces having the advantageous and desirable features and meritorious inherent characteristics and the mode of production thereof herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described.

The invention herein shown and described may be manufactured and used by the United States Government, for governmental purposes only, without the payment of license fees or royalty therefor.

In carrying out the herein described method, the various steps are preferably performed in the following sequence, and in the hereinafter described manner.

Assuming that the cylinder has been bored and honed or ground to the desired dimensions, it is then finish honed with a helical or longitudinal twisting motion which produces a definite cross hatch or criss-cross pattern of transversely intersecting incised lines which break the surface into intermediate island like plateaus. Such finish honing may be quite effectively performed upon a conventional "Barnes" vertical honing machine, whereby upon completion a uniform cross hatch pattern will have been developed possessing a surface roughness of approximately twenty-five to thirty micro inches profilometer reading.

After development of the cross hatch pattern, the plateau surfaces thereof are further interrupted or broken up by a lapping operation, using a lapping compound of granular abrasive combined with graphite or some analogous carrier substance, so that the cylinder walls may not become charged with abrasive.

Discard piston rings can be used for this lapping operation. One set of piston rings may be repeatedly used for lapping many cylinders. The purpose of this lapping operation is to produce highly pitted surfaces of the island like plateaus resulting from previous honing. The lapping compound or abrasive is applied in such manner that the abrasive grains tend to roll to produce the desired pitted or finely roughened surface in preference to sliding action which would tend to score the surface or remove metal. The edges of the piston rings should be rounded to facilitate the desired rolling action of the lapping compound abrasive component between the rings and the cylinder walls. In lieu of lapping with an abrasive compound, the roughened or pitted surfaces may be produced mechanically for example by a sharply knurled roller or analogous tool.

In whatever manner the pitting or roughness of the cylinder wall surfaces is effected, it should be of a degree of approximately forty to forty-five micro inches profilometer reading. The surface will then present a highly frosted appearance and afford a sharp feeling similar to that of approximately 400 (four hundred) grade abrasive cloth. This surface might be described as fuzzy because of the slight displacement of metal by the rolling action of the lapping compound abrasive.

After honing and lapping as described, the pitted and roughened cylinder surfaces are thoroughly washed with hot cleansing solutions to remove all remaining traces of lapping compound and particles of metal.

The cylinder walls having been suitably textured by the aforementioned honing and lapping operations to produce an intaglio design comprising the before described cross hatched and pitted effect, are then dusted or coated with a finely sub-divided free metallic lead. To temporarily retain the free lead powder distributed over the cylinder wall, the walls are moistened with a binder or carrier for the deposited lead. A preferable substance for this purpose is castor oil which has been boiled until all water has been evaporated, at which time it will have considerably darkened in color. However, boiled castor oil is not essential for this purpose. Other analogous moisture free substances of somewhat viscous character can be utilized in lieu of boiled castor oil.

The finely sub-divided metallic lead may be mechanically reduced to a flour like texture suitable for impregnating the bearing surfaces. However, molecular lead prepared from a chemical solution such as lead acetate by a chemical replacement process is the preferred form of surface coating and impregnating material. The lead dusted cylinder and assembled piston rings selected for cooperative use therewith are mounted on a machine similar to the lapping machine, in which the cylinder and rings have been previously worked to surface finished condition. The piston rings are caused to traverse under pressure the lead coated cylinder wall areas a sufficient number of times to securely compact the molecular lead into the cross hatching lines and pits of the textured areas of the cylinder walls until such lines and pits are completely filled and an extremely thin, tightly adherent lead film is distributed over the bearing surfaces, which by the rubbing and wiping action of the piston rings under pressure become burnished and highly polished.

Such molecular lead impregnating treatment enables a material reduction in the test block time to which the engine must be subjected, thus enabling a great saving in fuel and man hours, and materially increasing the productivity of the test facilities and equipment. Such lead coating of the cylinder walls with free molecular or finely sub-divided lead affords an inhibitor which prevents scoring or destructive action, with a decided tendency toward automatic healing in the event that grit or dust particles find entry to the cylinders.

It further eliminates the critical period during block tests enabling an engine to be operated under full speed and load after only a short warm-up period. These advantageous features continue to increase its reliability throughout the entire life of the engine.

An airplane engine, the cylinders and piston rings of which were so treated, was subjected to forty minutes warm-up operation gradually increased to a maximum speed of 2300 R. P. M. and then continued at that maximum speed with forty-two inch manifold pressure in a standard block test for two hours. Upon disassembling the engine after the above test, the cylinders were found in perfect condition and the piston rings were found seated to perfect seal. No difference could be detected between the condition of the cylinder wall surface and piston rings after twenty hours operating period than was apparent after one hour test time.

While the invention is especially desirable and applicable to engine cylinder and piston ring bearings, it is to be understood that other bearings, both rotary and reciprocatory, if subject to like lead impregnation will show similar beneficial and advantageous results.

The objective being to produce a porous surface on the cylinder wall which surface can be impregnated with lead, the procedure for producing such a surface may vary considerably depending on the nature of the material from which the cylinder barrel is made. The principal materials used for cylinder barrels are chrome molybdenum steel, Nitralloy steel, and cast iron. The process herein described is not limited to any specific means or procedure for preparing the cylinder surface so that it will receive the lead impregnation. The aforementioned described procedure has yielded excellent results.

An alternate method to that previously described comprises cutting fine grooves, either parallel or helical, similar to screw threads of quite low pitch, into which the lead deposit can be compacted or rolled after which the surface may be burnished to cause adherence of the lead to the cylinder walls and afford a uniform polished surface.

From the above description it will be apparent that there is thus provided a method of the character described possessing the particular features of advantage before enumerated as desirable, but which obviously is susceptible of modification in its steps, sequence thereof and detail construction and arrangement of parts of the finished product without departing from the principle involved or sacrificing any of its advantages.

While in order to comply with the statute the invention has been described in language more or less specific as to structural features and specific steps, it is to be understood that the invention is not limited to the specific features shown, but that the means and mode of production herein disclosed comprise the preferred form of several modes of putting the invention into effect, and the invention is therefore claimed in any of its forms or modifications within the legitimate and valid scope of the appended claim.

Having thus described my invention, I claim:

The method of treating a cylinder of an internal combustion engine which has previously been processed to required dimension, including the steps of honing the cylinder walls to produce thereon a cross hatched pattern of incised lines and intermediate island like plateaus, lapping the plateau faces of the cylinder walls with a granular abrasive lapping compound, causing the abrasive granules of the lapping compound to roll upon the plateau surfaces, producing pitting of the plateau surfaces by said rolling action of the abrasive granules of the lapping compound, cleansing the honed and lapped surfaces, coating the honed and lapped surfaces with free, finely sub-divided metallic lead, compacting the finely divided lead into the incised lines of the cross hatched pattern and the pits of the lapped surfaces until filled, and burnishing and polishing the deposited lead in said incised lines, in the pits and on said surfaces into a thin, adherent lead film coextensive with the honed and lapped surfaces.

CARL W. ALBERTSON.

REFERENCES CITED

The following references are of record in the file of this patent:

UNITED STATES PATENTS

| Number | Name | Date |
| --- | --- | --- |
| 494,668 | Clamer | Apr. 4, 1893 |
| 706,702 | Thurston | Aug. 12, 1902 |
| 1,322,408 | Chandler | Nov. 18, 1919 |
| 1,420,551 | Ivins | June 20, 1922 |
| 1,481,936 | Thomson | Jan. 29, 1924 |
| 1,484,516 | MacFarland | Feb. 19, 1924 |
| 1,856,272 | Summers | May 3, 1932 |
| 2,004,708 | Pfanstiehl | June 11, 1935 |
| 2,075,518 | Gettleman | Mar. 30, 1937 |
| 2,198,240 | Boegehold | Apr. 23, 1940 |
| 2,266,320 | Hobbs | Dec. 16, 1941 |
| 2,378,588 | Skehan et al. | June 9, 1945 |
| 2,412,698 | Van Der Horst | Dec. 17, 1946 |
| 2,414,923 | Batcheller | Jan. 28, 1947 |
| 2,423,880 | DeGraaf | July 15, 1947 |

FOREIGN PATENTS

| Number | Country | Date |
| --- | --- | --- |
| 23,179 | Great Britain | 1898 |